US009361748B2

(12) United States Patent
Cunningham et al.

(10) Patent No.: US 9,361,748 B2
(45) Date of Patent: Jun. 7, 2016

(54) PHARMACEUTICAL DISPENSING SYSTEMS, METHODS AND COMPUTER PROGRAM PRODUCTS FOR DETERMINING AND DISPLAYING REPLENISHMENT INFORMATION

(71) Applicant: Parata Systems, LLC, Durham, NC (US)

(72) Inventors: Paul Joseph Cunningham, Hillsborough, NC (US); Sasha Morris, Cary, NC (US)

(73) Assignee: Parata Systems, LLC, Durham, NC (US)

( * ) Notice: Subject to any disclaimer, the term of this patent is extended or adjusted under 35 U.S.C. 154(b) by 294 days.

(21) Appl. No.: 14/084,070

(22) Filed: Nov. 19, 2013

(65) Prior Publication Data

US 2014/0148945 A1    May 29, 2014

Related U.S. Application Data

(60) Provisional application No. 61/730,558, filed on Nov. 28, 2012.

(51) Int. Cl.
| | |
|---|---|
| G06Q 10/08 | (2012.01) |
| G07F 11/44 | (2006.01) |
| G07F 9/02 | (2006.01) |
| G07F 17/00 | (2006.01) |

(52) U.S. Cl.
CPC ............. *G07F 11/44* (2013.01); *G06Q 10/087* (2013.01); *G07F 9/026* (2013.01); *G07F 17/0092* (2013.01)

(58) Field of Classification Search
CPC ........... G07F 17/0092; G06Q 30/0635; G06Q 10/087; G06F 19/3462

USPC ............................................. 700/236; 705/28
See application file for complete search history.

(56) References Cited

U.S. PATENT DOCUMENTS

| 5,208,762 | A | 5/1993 | Charhut et al. |
| 5,713,487 | A * | 2/1998 | Coughlin .............. G06Q 20/342 700/237 |
| 5,720,154 | A * | 2/1998 | Lasher ....................... G07F 5/18 53/411 |
| 5,839,257 | A | 11/1998 | Soderstrom et al. |
| 6,364,517 | B1 | 4/2002 | Yuyama et al. |
| 6,497,342 | B2 * | 12/2002 | Zhang ..................... B65B 35/08 221/121 |
| 6,898,919 | B2 | 5/2005 | Kim |
| 7,006,893 | B2 * | 2/2006 | Hart ...................... G06F 19/322 700/231 |
| 7,059,098 | B2 | 6/2006 | Kim |
| 7,072,855 | B1 | 7/2006 | Godlewski et al. |
| 7,258,248 | B2 | 8/2007 | Kim |

(Continued)

*Primary Examiner* — Timothy Waggoner
(74) *Attorney, Agent, or Firm* — Myers Bigel & Sibley

(57) ABSTRACT

A pharmaceutical dispensing system includes a frame having first and second opposed sides, a plurality of cells configured to house pharmaceutical pills, and a display on the frame first side. A plurality of dispensing shelves configured to receive filled pill containers are accessible from the second side of the frame for removal of pill containers therein. The pharmaceutical dispensing system includes a processor and memory coupled thereto. A computer program resides in the memory and is executable by the processor for displaying a cell inventory graphical user interface (GUI) within the display. The cell inventory GUI includes a GUI control that is responsive to user activation for displaying replenishment information about one or more of the cells. The computer program is configured to determine a replenish point and replenish quantity for each cell and is configured to adjust the replenish quantity for each cell according to a stock-out risk.

18 Claims, 15 Drawing Sheets

(56) References Cited

U.S. PATENT DOCUMENTS

| | | | |
|---|---|---|---|
| 7,263,411 B2 * | 8/2007 | Shows | G06F 19/3462 700/236 |
| 7,747,345 B2 * | 6/2010 | Ohmura | G06F 19/3462 700/231 |
| 7,860,724 B2 | 12/2010 | Chudy et al. | |
| 8,670,864 B2 | 3/2014 | Henderson et al. | |
| 2006/0167719 A1 | 7/2006 | Kim | |
| 2006/0247985 A1 * | 11/2006 | Liamos | G06F 19/328 705/28 |
| 2008/0115456 A1 | 5/2008 | Kim | |
| 2009/0043421 A1 | 2/2009 | Parrish et al. | |
| 2010/0082458 A1 * | 4/2010 | Godlewski | G06Q 30/0635 705/28 |
| 2010/0153129 A1 | 6/2010 | Luciano, Jr. et al. | |
| 2012/0330460 A1 * | 12/2012 | Henderson | G06F 19/3456 700/231 |

* cited by examiner

PHARMACEUTICAL DISPENSING SYSTEMS, METHODS AND COMPUTER PROGRAM PRODUCTS FOR DETERMINING AND DISPLAYING REPLENISHMENT INFORMATION

RELATED APPLICATION

This application claims the benefit of and priority to U.S. Provisional Patent Application No. 61/730,558 filed Nov. 28, 2012, the disclosure of which is incorporated herein by reference as if set forth in its entirety.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

FIELD OF THE INVENTION

The present invention relates generally to the dispensing of prescriptions of pharmaceuticals and, more particularly, to methods, systems and computer program products for automated and semi-automated dispensing of pharmaceuticals.

BACKGROUND

Pharmacy generally began with the compounding of medicines, which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable. Various attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. As automated pharmacy machines have become substantially more robust and complex, operating software that is correspondingly robust is needed to facilitate user interaction and control of these machines.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

In view of the above discussion, automated and semi-automated pharmacy dispensing systems are provided. According to some embodiments of the present invention, a pharmaceutical dispensing system includes a frame having first and second opposed sides, a plurality of cells configured to house pharmaceutical pills, each of the cells being accessible from the first side of the frame for replenishment of pharmaceutical pills therein, and a display on the frame first side. A plurality of dispensing shelves configured to receive filled pill containers are accessible from the second side of the frame for removal of pill containers therein.

The pharmaceutical dispensing system includes a processor and memory coupled thereto. A computer program resides in the memory and is executable by the processor for displaying a cell inventory graphical user interface (GUI) within a display, wherein the cell inventory GUI displays cell inventory information, and wherein the cell inventory GUI comprises a GUI control that is responsive to user activation for displaying replenishment information about one or more of the cells. In some embodiments of the present invention, the GUI control displays a number of cells requiring replenishment. In some embodiments of the present invention, the replenishment information for each cell includes an identification of a drug to be replenished within the cell, a total number of pills needed to replenish the cell, and/or a total number of stock bottles needed to replenish the cell.

In some embodiments of the present invention, the computer program is configured to determine a replenish point and replenish quantity for each cell. In addition, the replenish quantity for each cell can be adjusted according to a stock-out risk for each cell.

In some embodiments, the computer program is configured to identify any cells that are currently in operation that were not in operation during the previous day and to identify any cells that were in operation during the previous day that are not currently in operation. In some embodiments, the computer program is configured to identify any cells that are currently in operation that contain a different drug from the previous day.

In some embodiments of the present invention, the computer program is configured to predict when pills will be needed in the future for one or more cells and automatically place an order from a drug source such that sufficient pill inventory is on hand prior to a future date.

According to some embodiments of the present invention, a method of determining replenishment quantities for pills dispensed by an automated or semi-automated pharmaceutical dispensing system includes statistically analyzing, via at least one processor, historical dispensing data to determine a replenish point and a replenish quantity for each cell, wherein the replenish point is a threshold amount below which requires the cell to be replenished with pills, and wherein the replenish quantity is an amount of pills to be added to the cell when a quantity of pills in the cell is below the replenish point. The replenish quantity may be adjusted based upon stock-out risk for any given day. Adjusting the replenish quantity based upon stock-out risk for any given day may include selecting a multiple value and calculating the replenish quantity by multiplying a standard deviation of a daily dispense quantity by the multiple value. The daily dispense quantity may be a daily dispense quantity for a cell or for a pharmaceutical pill.

For example, in some embodiments, a replenish quantity for each cell may be calculated as at least $1.5\sigma$, wherein $\sigma$ represents a standard deviation of daily pill dispense quantity for a respective cell. In some embodiments, a replenish quantity for each cell may be calculated as between about $1.5\sigma$ and about $2.5\sigma$, wherein $\sigma$ represents a standard deviation of daily pill dispense quantity for a respective cell.

According to some embodiments of the present invention, a computer program product includes a non-transitory computer readable storage medium having encoded thereon instructions that, when executed on a processor, causes the processor to perform the following operations: statistically analyzing historical dispensing data to determine a replenish point and a replenish quantity for each cell, and displaying a cell inventory graphical user interface (GUI) within a display, wherein the cell inventory GUI displays cell inventory information. The displayed cell inventory GUI includes a GUI control that is responsive to user activation for displaying replenishment information about one or more of the cells. The GUI control displays a number of cells requiring replenishment, and the replenishment information for each cell includes an identification of a drug to be replenished within the cell, a total number of pills needed to replenish the cell, and/or a total number of stock bottles needed to replenish the cell.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

DETAILED DESCRIPTION

Figure 1:
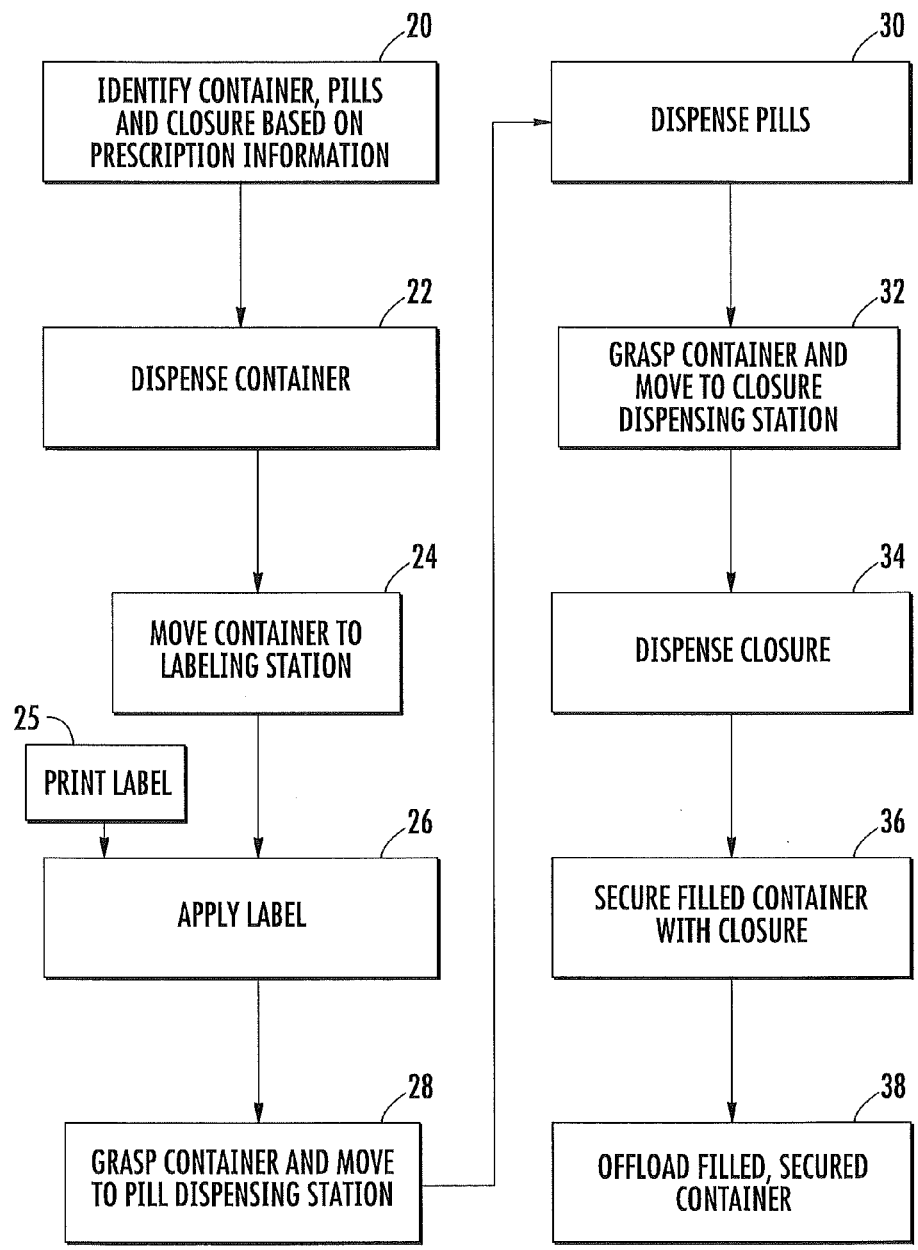
FIG. 1 is a flow chart depicting operations that can be carried out by an automated pharmaceutical dispensing system.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

It will also be understood that, although the terms first, second, etc., may be used herein to describe various elements, these elements should not be limited by these terms. These terms are only used to distinguish one element from another. For example, a first GUI control could be termed a second GUI control, and, similarly, a second GUI control could be termed a first GUI control without departing from the teachings of the disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "container", as used herein, refers to any type of container including pill containers, bottles or vials used to fill a prescription, as well as "stock" bottles that contain pills used to refill cells on the replenishing side of a pharmacy dispensing system.

The term "pharmaceutical dispensing system", as used herein, refers to any type of pharmaceutical dispensing system including, but not limited to, automated systems that fill containers with pills, semi-automated systems that fill containers with pills, and systems that dispense and package individual and/or multiple doses of medications.

The term "pills" refers to any type of medicament that can be counted and dispensed by an automated and semi-automated pharmacy system including, but not limited to, capsules, tablets, caplets, gel caps, lozenges, and the like.

The term "wizard", as used herein, refers to a computer utility designed to simplify the execution of lengthy or complicated tasks. As known to those of skill in the art, a wizard is essentially a programmatic method of providing guidance to a user via a series of GUIs.

The present invention may be embodied as systems, methods, and/or computer program products for carrying out various operations of an automated or semi-automated pharmacy machine. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any tangible medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM).

The present invention is described herein with reference to graphical user interfaces (GUIs), flowchart illustrations and block diagram illustrations of methods, systems, and computer program products for implementing various operations, including pill replenishment operations of a pharmaceutical dispensing system (automated and semi-automated), and including pill replenishment operations of pharmaceutical dispensing systems that dispense and package individual doses of medications such as disclosed in U.S. Pat. Nos. 7,258,248; 7,059,098; 6,898,919; and 5,839,257; and in U.S. Patent Application Publication Nos. 2008/0115456 and 2006/0167719, each of which is incorporated herein by reference in its entirety, according to embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the GUIs, flowcharts and/or block diagram block or blocks.

These computer program instructions may also be stored in a computer usable or computer-readable memory such that the instructions produce an article of manufacture including instructions that implement the functions specified in the GUIs, flowcharts and block diagram block.

The computer program instructions may also be loaded onto a controller or other programmable data processing apparatus to cause a series of operational steps to be performed on the controller or other programmable apparatus to produce a computer implemented process such that the instructions that execute on the controller or other programmable apparatus provide steps for implementing the functions specified in the GUIs, flowcharts, and block diagram blocks.

Referring to FIG. 1, an exemplary process of an automated or semi-automated pharmaceutical dispensing system for processing a prescription is described. The process begins with the identification of the proper container (i.e., a vial that will be used to contain the medicine), pills, and closure to be dispensed based on a patient's prescription information (Block 20). A container of the proper size is dispensed at a container dispensing station (Block 22), then moved to a labeling station (Block 24). A printing station prints a label (Block 25) that is applied to the container at the labeling station (Block 26), after which the labeled container is transferred to a pill dispensing station (Block 28), from which the designated pills are dispensed in the designated amount into the container (Block 30). The filled container is then moved to a closure dispensing station (Block 32), where a closure of the proper size has been dispensed (Block 34). The filled container is secured with a closure (Block 36), then transported to an offload station and offloaded (Block 38).

Figure 2:
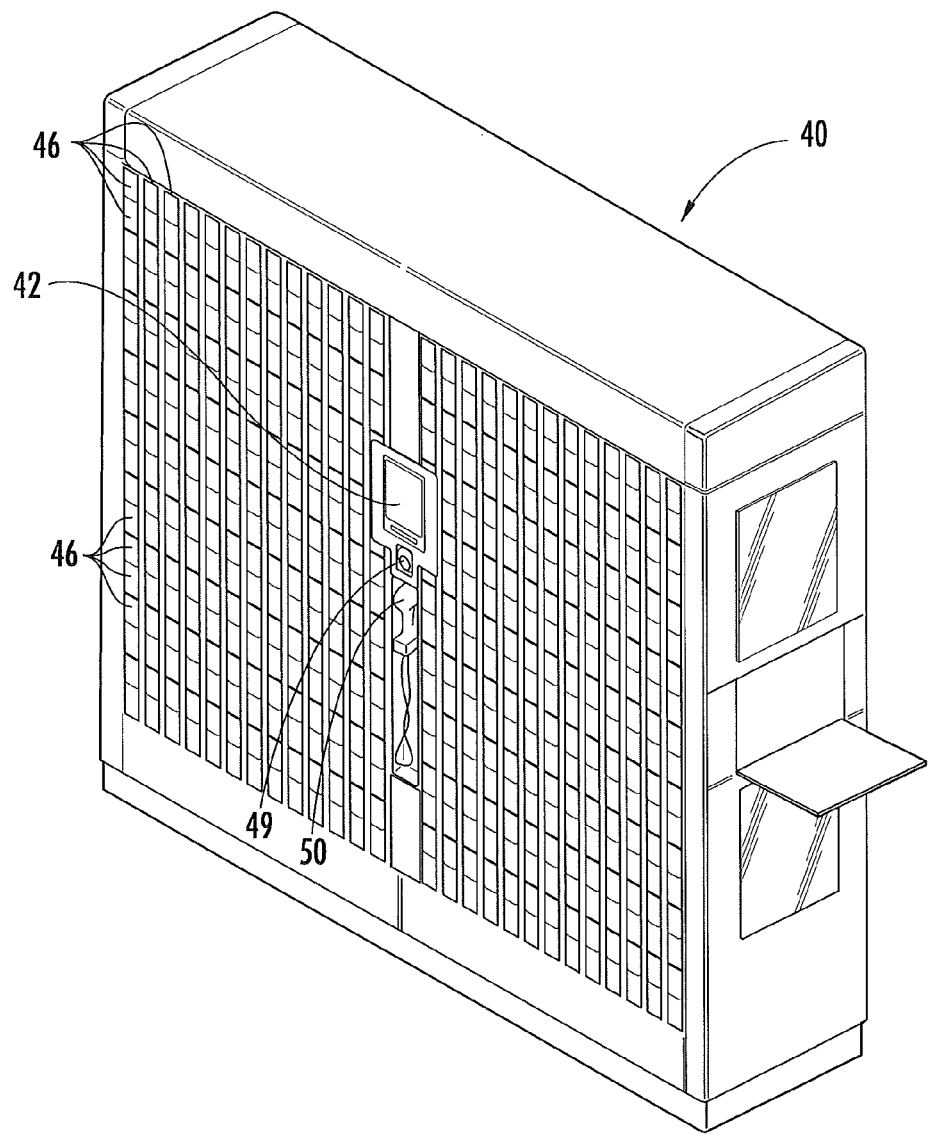
FIG. 2 is a front perspective view of an exemplary automated pharmaceutical dispensing system, and in which embodiments of the present invention can be implemented.
Figure 3:
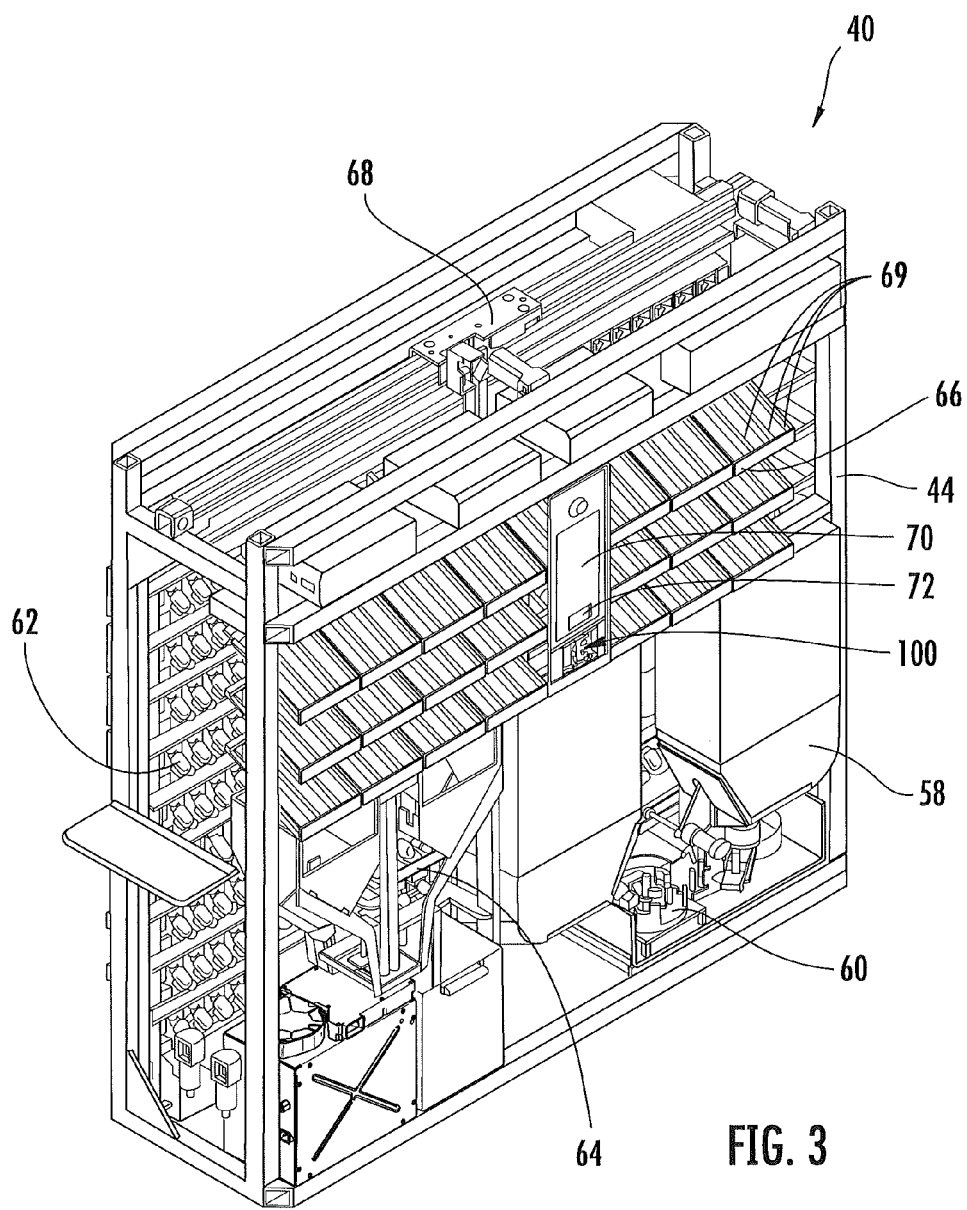
FIG. 3 is an opposite side front perspective view of the pharmaceutical dispensing system of FIG. 2 with the outer skin removed to permit visual access to components housed therein.

An exemplary pharmaceutical dispensing system that can carry out this process is illustrated in FIGS. 2 and 3 and is designated broadly therein at 40. The system 40 includes a support frame 44 for the mounting of its various components. The system 40 generally includes as operative stations a controller (represented in FIGS. 2 and 3 by graphics user interface monitors 42 and 70), a container dispensing station 58, a labeling station 60, a pill dispensing station 62, a closure station 64, and an offloading station 66 including a plurality of bins or shelves 69. In the illustrated embodiment, containers, closures, and filled containers are moved between these stations with a single carrier or robotic arm 68; however, in some embodiments additional carriers/robotic arms may be employed. The operation of the container dispensing station 58, the labeling station 60, the pill dispensing station 62, and the closure station 64, and the offloading station 66 are described in, for example, U.S. Pat. Nos. 8,261,936, 7,596,932, 7,980,419, 8,016,095, 7,344,049, and U.S. Patent Application Publication Nos. 2008/0110555 and 2008/0283179, the disclosure of each is incorporated by reference herein in its entirety.

It is understood, however, that embodiments of the present invention can be utilized with pharmaceutical dispensing systems that do not have all of the automated functionality described with respect to FIG. 1. For example, a pharmaceutical dispensing system, according to some embodiments of the present invention, may not have automated label generation and/or application capabilities, etc. Embodiments of the present invention may be utilized with various types of automated and semi-automated pharmaceutical dispensing systems.

According to some embodiments of the present invention, monitors 42 and 70 are touch screen monitors that display graphical user interfaces (GUIs) that allow operators to perform various functions. For example, an operator interacts with graphical representations (e.g., application icons) and controls (e.g., buttons, scroll bars, etc.) collectively referred to herein as GUI controls. These GUI controls perform various functions in response to physical touching by an operator (e.g., touching, tapping, swiping, etc., via a finger or stylus). GUIs displayed on each side of the pharmaceutical dispensing system 40 relate to tasks that can be performed on the respective sides of the pharmaceutical dispensing system 40. For example, an operator monitors and controls the filling of prescriptions by interacting with GUI controls displayed via the dispensing side monitor 70. An operator performs cell replenishment operations by interacting with GUI controls displayed via the replenishing side monitor 42.

Although the illustrated pharmaceutical dispensing system 40 employs robotic automation to fill prescription orders, the system 40 still may require a certain amount of operator monitoring and management. An operator monitors the pharmaceutical dispensing system 40 and interacts with it when initiating certain functions and procedures, e.g., replenishing a counting cell 46, processing a manual prescription fill, etc. According to some embodiments of the present invention, the various GUIs may share a common set of functional GUI controls. Moreover, all GUI windows and screens are labeled and may employ a consistent "look and feel." In addition, GUI controls related to routine prescription queue management activities are informative and may be color-keyed. Some GUI controls appear on all toolbars and wizards displayed within the various GUIs. Other GUI controls are context-sensitive.

Instead of employing physical input devices, such as a keyboard, numeric keypad, or mouse, the various GUIs display a virtual keyboard/keypad when one is needed. The operator's finger, in effect, replaces the mouse. According to embodiments of the present invention, the virtual keyboard displayed in various ones of the GUIs may include a filtering function, as will be described below.

The side of the system 40 illustrated in FIG. 2 is referred to as the "inventory side" or "replenishing side." The replenishing side of the system 40 includes an array of cells 46, each of which is configured to store pills of a respective drug. The replenishing side of the illustrated system 40 also includes barcode scanners 49, 50 for scanning barcodes associated with cells 46 and containers. The system 40 dispenses pills from a cell 46 to fill a particular prescription. GUIs displayed via the monitor 42 on the replenishing side are configured to display various types of information to an operator regarding the status of pill inventory in the various cells 46. In addition, various operator tasks may be performed via GUIs displayed via the replenishing side monitor 42 including, but not limited to, operations associated with replenishing cells 46 with pills, adding a new drug to inventory, setting up parameters of a cell 46, modifying parameters of cells 46, and performing return-to-stock (RTS) operations, etc.

The side of the system 40 illustrated in FIG. 3 is referred to as the "prescription side" or the "dispensing side." The monitor 70 on the dispensing side displays, via various GUIs, information to an operator regarding the status of prescription filling operations (e.g., pending, complete, incomplete, etc.). If a prescription filling operation cannot be completed for some reason, a GUI displays relevant information regarding this via monitor 70. In addition, various operator tasks may be performed via GUIs displayed via the dispensing side monitor 70 including, but not limited to, prescription order monitoring/processing, performing manual prescription filling, scanning out completed prescriptions, resubmitting exceptions, and performing system operations (e.g., homing/parking the robotic arm 68, configuring cells 46, running diagnostics, etc.).

Dispensing Side

Prescription processing is monitored and managed from the dispensing side (FIG. 3) of the system 40. An operator monitors and controls the filling of prescription orders by touching various GUI controls in the GUIs displayed on the dispensing side monitor 70. Dispensing side tasks include prescription order monitoring/processing, performing manual prescription fills, scanning out completed prescriptions, resubmitting exceptions, and performing routine system operations (e.g., homing/parking the robotic arm 68, configuring cells 46, running diagnostics, etc.).

Figure 4:
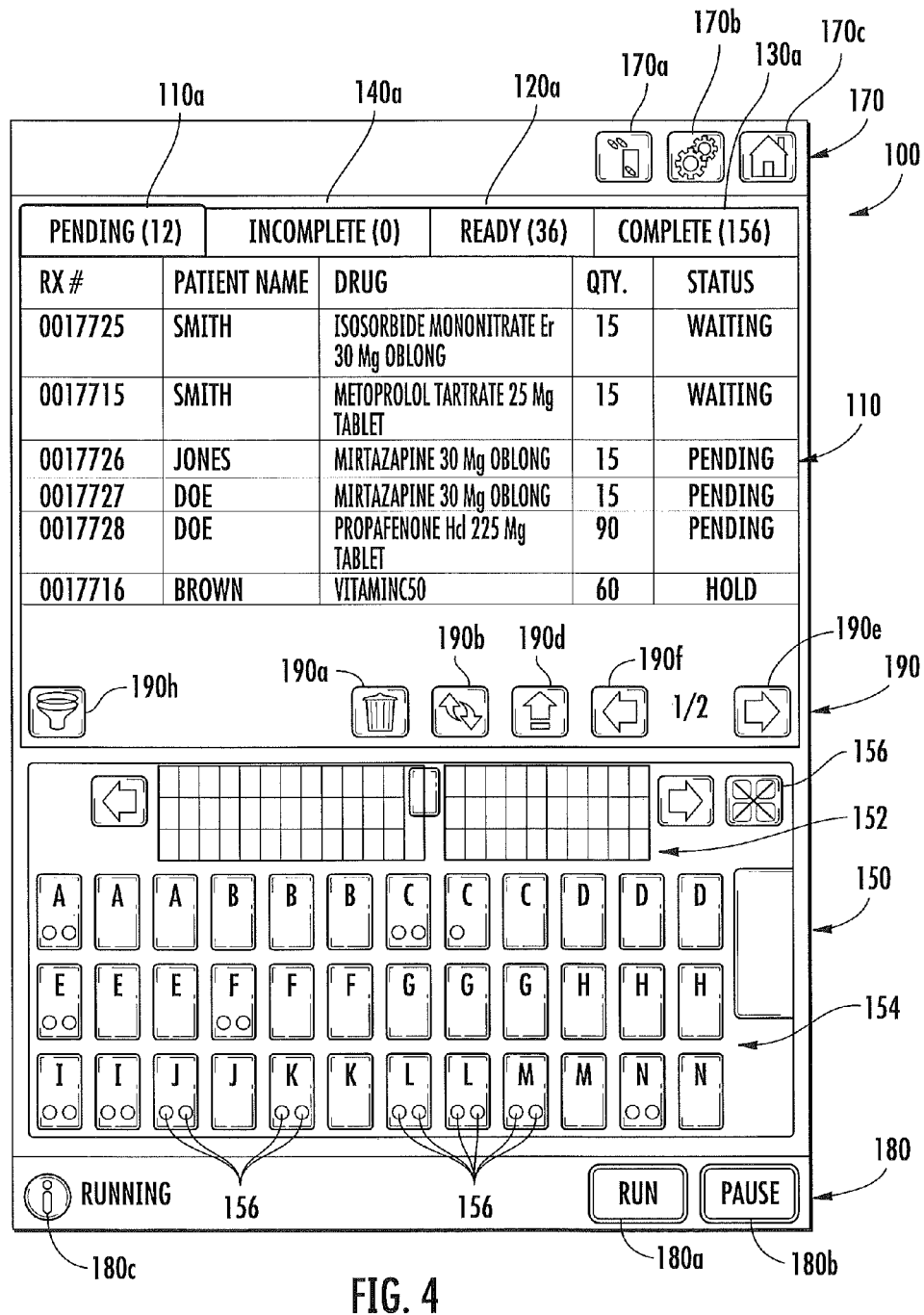
FIGS. 4-7 are graphical user interfaces (GUIs) that allow an operator of the pharmaceutical dispensing system of FIGS. 2-3 to perform various drug dispensing functions.
Figure 5:
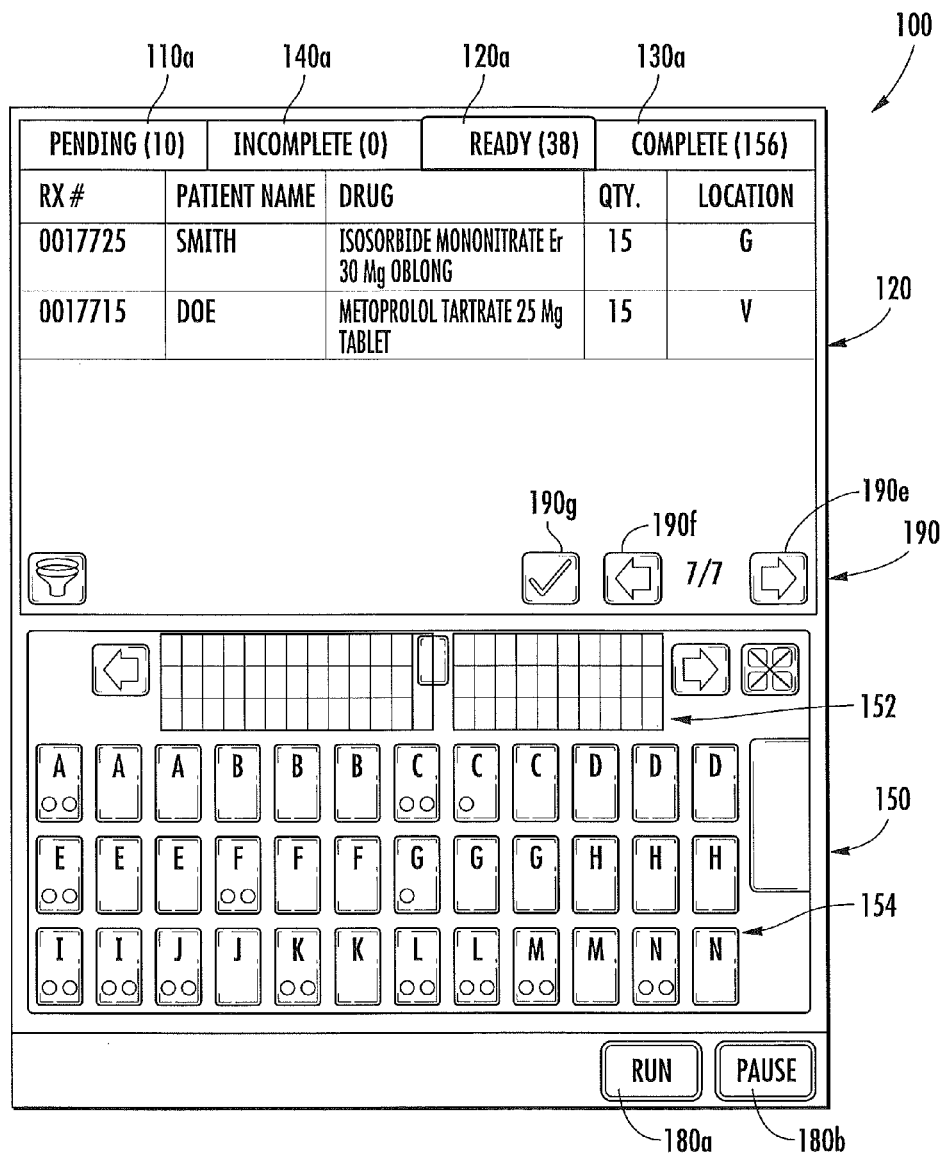

An exemplary Home GUI 100 is illustrated in FIG. 4 and is utilized for prescription monitoring and prescription queue management activities. An upper portion of the Home GUI 100 displays prescription orders that have been transmitted from a pharmacy's computer to the system 40. The Home GUI 100 displays a series of GUIs, wherein each GUI in the series comprises status information about a prescription order at a respective stage of completion of the prescription order by the pharmaceutical dispensing system 40. In the illustrated Home GUI 100, the series of GUIs includes a Pending Queue GUI 110 (FIG. 4), a Ready Queue GUI 120 (FIG. 5), a Complete Queue GUI 130 (FIG. 6), and an Incomplete Queue GUI 140 (FIG. 7). Each of these GUIs includes a tab that, when touched by an operator, displays the respective GUI within the Home GUI 100. For example, the Pending Queue GUI 110 includes tab 110*a*, the Ready Queue GUI 120 includes tab 120*a*, a Complete Queue GUI 130 includes tab 130*a*, and the Incomplete Queue GUI 140 includes tab 140*a*.

The number of prescription orders in each of the various GUIs 110-140 appears in the respective tab 110*a*-140*a* associated therewith. For example, in the illustrated embodiment of FIG. 4, there are twelve (12) pending prescription orders, zero (0) incomplete prescription orders, thirty-six (36) ready prescription orders, and one hundred fifty six (156) complete prescription orders. Touching each of the columns in the queue of each of the GUIs 110-140 sorts the items in that column (ascending/descending). In addition, an operator can filter the ready queue to display all prescription orders for a particular patient by touching Filter GUI control 190*h*.

The Pending Queue GUI 110 displays all prescription orders coming into the system 40 for filling. For example, the Pending Queue GUI 110 displays prescription orders that have been transmitted by a pharmacy computer system to the pharmaceutical dispensing system 40 and/or that have been entered into the pharmaceutical dispensing system 40 manually by an operator. The Ready Queue GUI 120 displays all prescription orders that have been successfully filled and that are ready for pickup. The Incomplete Queue GUI 140 displays all prescription orders that, for whatever reason, were not successfully filled (i.e., exception prescription orders, etc.). The Complete Queue GUI 130 displays all prescription orders that have been filled and picked up, as well as prescription orders that have been deleted, canceled or cleared from the prescription drop-off or dispensing shelves 69. The Home GUI 100 allows an operator to easily display prescription orders that are pending, incomplete, ready and complete by selecting the appropriate tab 110*a*-140*a*.

As each prescription order is processed by the pharmaceutical dispensing system 40, a pill container (i.e., vial) is labeled, filled, capped, and then deposited in a dispensing shelf 69 (FIG. 3), usually by the patient's last name. The processed prescription order automatically appears in the Ready Queue GUI 120, illustrated in FIG. 5, and is automatically removed from the Pending Queue GUI 110. The Ready Queue GUI 120 identifies the location (i.e., the dispensing shelf 69) of the filled pill container. For example, in the illustrated embodiment, the information displayed in the Ready Queue GUI 120 includes prescription number, patient name, drug, quantity, and location. An operator locates the dispensing shelf 69 containing the filled container, removes the container therefrom, and scans the bar code on the container label via a scanner 72 associated with the pharmaceutical dispensing system 40.

Figure 6:
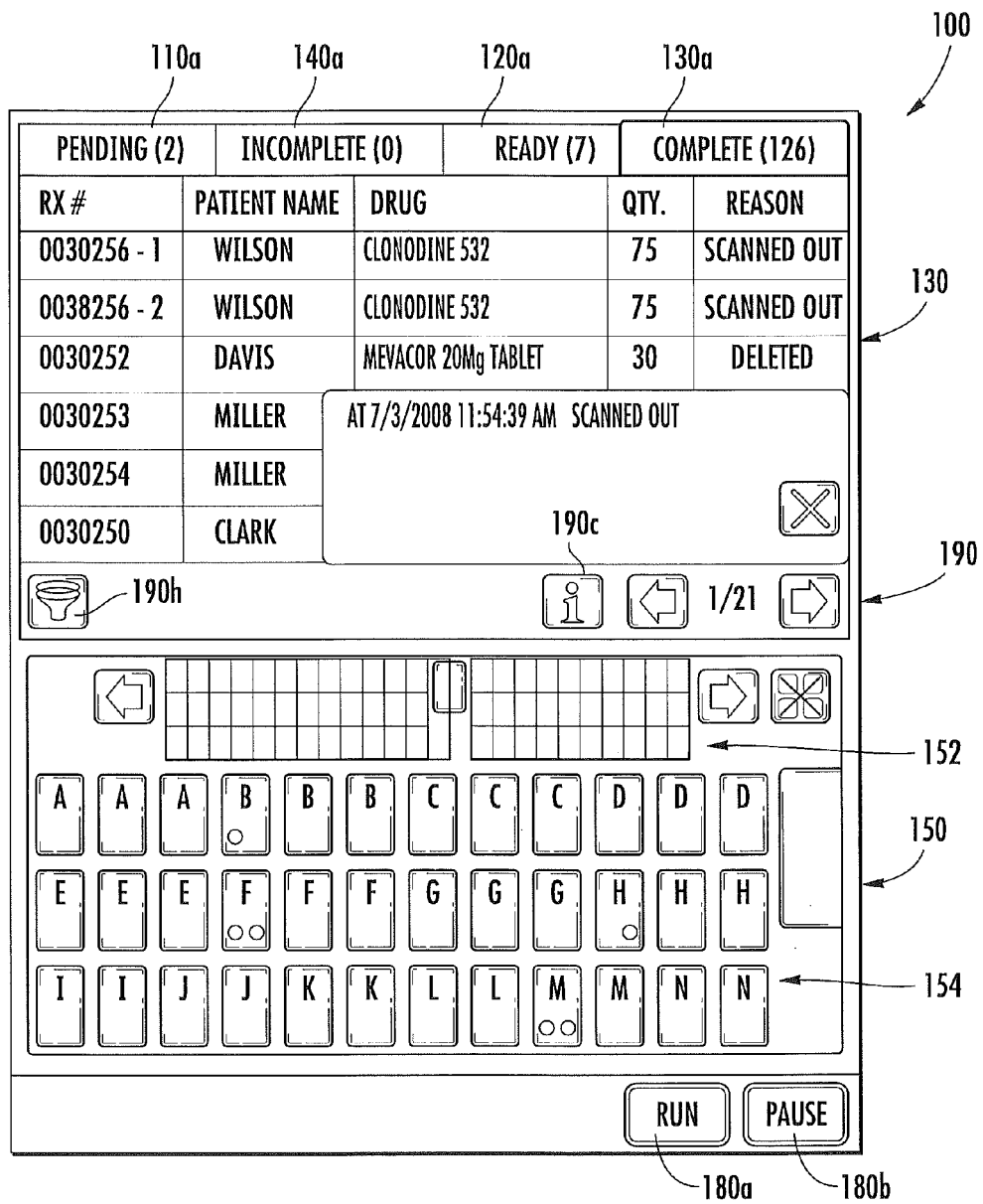
Figure 7:
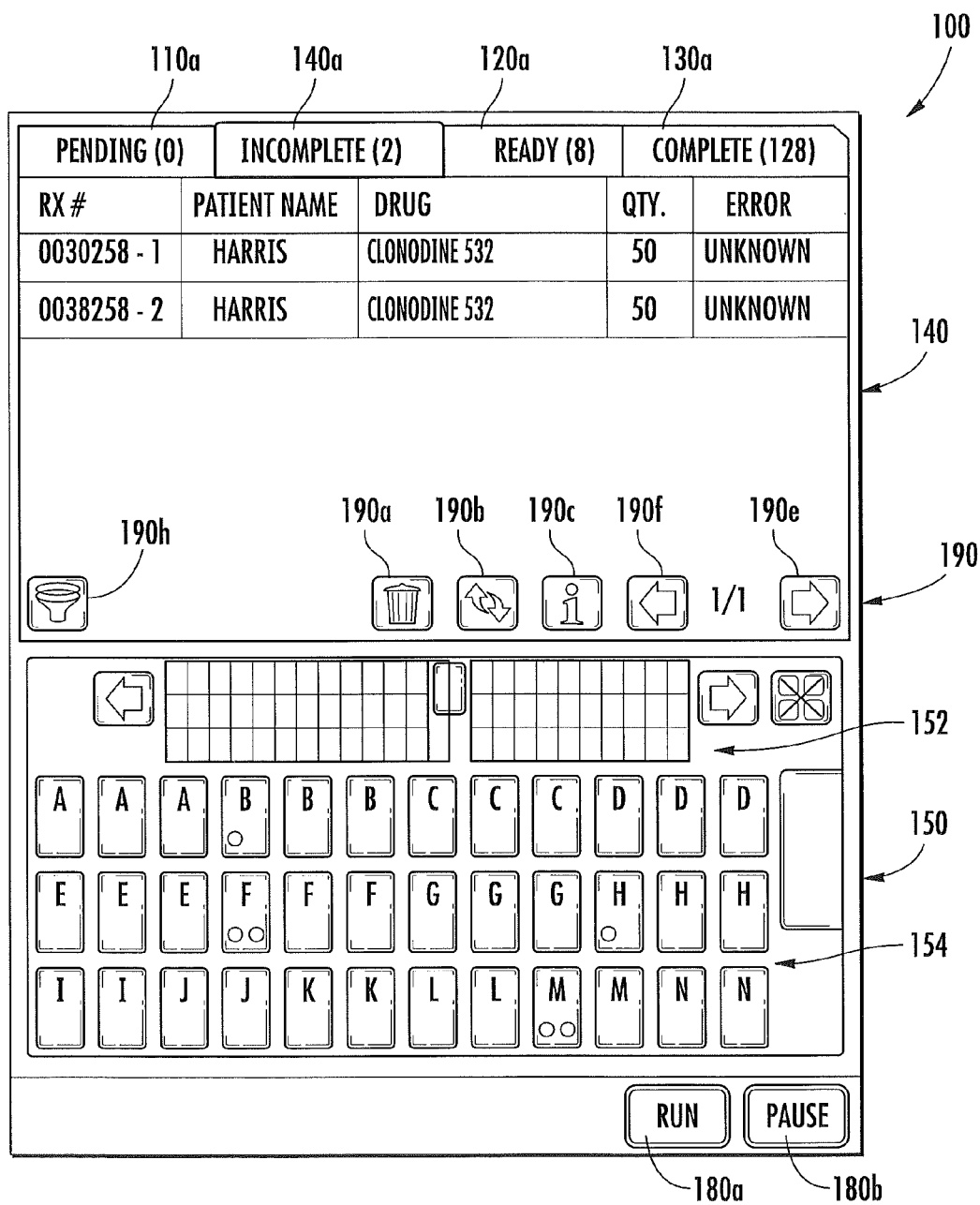

Scanning a container's bar code, for example via scanner 72, transfers a prescription from the Ready Queue GUI 120 (FIG. 5) to the Complete Queue GUI 130 (FIG. 6). The Complete Queue GUI 130 lists all completed prescription orders that have been processed by the system 40, as well as orders deleted, cancelled, or cleared from the dispensing shelves 69. The illustrated Complete Queue GUI 130 displays the following information: prescription number, patient name, drug, quantity, and reason for the prescription order being designated as "complete."

Incomplete prescription orders are displayed in the Incomplete Queue GUI 140 (FIG. 7). The illustrated Incomplete Queue GUI 140 displays the following information: prescription number, patient name, drug, quantity, and error (i.e., the reason for the prescription order being designated as "incomplete"). Causes for incomplete prescription orders include, but are not limited to, insufficient pill inventory, malfunctioning containers, malfunctioning labels, prescription orders that were not filled, capped or labeled correctly, or that were cancelled, etc. When an operator selects a prescription order displayed in the Incomplete Queue GUI 140 and then activates GUI control 190*c* (FIG. 6), the reason that the selected prescription order is incomplete appears in a pop-up window.

A lower portion of the Home GUI 100 displays the Ready Shelf GUI 150 that is a graphical representation of the dispensing shelves 69 (FIG. 3) and prescription orders that are ready and that await pickup therefrom. In the illustrated embodiment, the Ready Shelf GUI 150 is displayed within the Home GUI 100 when each of the above-described GUIs is displayed in the upper portion of the Home GUI 100, i.e., the Pending Queue GUI 110, the Ready Queue GUI 120, the Complete Queue GUI 130, and the Incomplete Queue GUI 140. Via the Ready Shelf GUI 150, an operator can perform various functions including clear individual prescription dispensing shelves 69, clear all dispensing shelves 69, print prescription dispensing shelf labels, and confirm pill container pickup from a dispensing shelf 69.

The illustrated Ready Shelf GUI 150 displays a graphical representation 152 of the array of dispensing shelves 69 of the pharmaceutical dispensing system 40. Below the array representation 152 is an array of icons 154, each identified by a letter and each associated with a respective dispensing shelf 69. Dots 156 in the various icons 154 indicate the number of prescription orders that are currently in dispensing shelves 69 awaiting pickup. Each icon 154 represents a respective dispensing shelf 69 of the pharmaceutical system 40.

The Home GUI 100 has an upper main toolbar 170 (FIG. 4) and a lower main toolbar 180 (FIG. 4). GUI controls included in the upper main toolbar 170 include Manual Fill GUI control 170*a*, System Functions GUI control 170*b* and Home GUI control 170*c*. Manual Fill GUI control 170*a*, when touched by an operator, allows the operator to enter a prescription into the system 40 manually (rather than it being sent to the system 40 automatically, such as from a pharmacy host system). Upon activating GUI control 170*a*, a manual fill wizard is launched that allows an operator to fill a prescription order manually. System Functions GUI control 170*b* allows an operator to display and/or configure various parameters of the pharmaceutical dispensing system 40. Home GUI control 170*c*, when touched by an operator, displays the Home GUI 100.

GUI controls included in the lower main toolbar 180 include Run GUI control 180*a*, Pause GUI control 180*b*, and Open Message Queue GUI control 180*c*. A user touches the Run GUI control 180*a* to process and fill prescription orders. In "Run" mode, pending prescription orders are filled. A user touches the Pause GUI control 180*b* to suspend prescription order processing. In "Pause" mode, prescription orders can be submitted to the pharmaceutical dispensing system 40, but are not filled until the Run GUI control 180*a* is touched. The Open Message Queue GUI control 180*c*, when touched by a user, opens the alert message queue. Open Message Queue GUI control 180*c* is displayed automatically when there is a message. The alert message queue contains messages generated by the pharmaceutical dispensing system 40, for example, error messages that relate to system-level problems such as with filling prescriptions, etc. Touching the Open Message Queue GUI control 180*c* displays a list of the most recent alert messages (e.g., up to five, etc.) issued by the pharmaceutical dispensing system 40.

The illustrated Home GUI 100 also has a taskbar 190 containing context-sensitive GUI controls. GUI controls are enabled only when their functions can be performed via the currently displayed queue GUI (e.g., Pending Queue GUI 110, Ready Queue GUI 120, Complete Queue GUI 130, Incomplete Queue GUI 140). Delete GUI control 190*a* deletes a selected prescription order. For example, to delete or cancel a pending prescription order from the pending queue, an operator selects a pending prescription order in the Pending Queue GUI 110 and then touches GUI control 190*a* to delete the prescription.

Retry GUI control 190*b* resubmits a prescription order. This is used mainly to retry running/waiting prescription orders. In operation, a prescription order displayed in the Pending Queue GUI 110 is selected. The operator then touches GUI control 190*b* to resubmit the selected prescription order for processing.

Details GUI control 190*c* (FIG. 6) displays detail information about incomplete (and complete) prescription orders. Advance GUI control 190*d* (FIG. 4) moves a prescription order to the top of its queue. For example, a prescription order displayed within Pending Queue GUI 110 is selected. An operator then touches GUI control 190*d* to advance this prescription order to the top of the displayed queue.

Next/Last GUI controls 190*e*, 190*f* allow an operator to move forward and backward, respectively, through multiple pages of displayed information.

During automated prescription order processing via the pharmaceutical dispensing system 40, an operator monitors and manages the prescription order processing via the Home GUI 100. In the Pending Queue GUI 110, pending prescription orders are displayed. In other words, prescription orders sent to the pharmaceutical dispensing system 40 from a pharmacy computer are displayed within Pending Queue GUI 110. If the pharmaceutical dispensing system 40 is not in "Run" mode, the operator touches the Run GUI control 180*a*. As each prescription order is processed, it is labeled, filled, capped, and deposited in a prescription dispensing shelf 69, customarily by the patient's last name.

In FIG. 4, the illustrated Pending Queue GUI 110 displays a list of prescription orders that have been sent to the pharmaceutical dispensing system 40. The first two records correspond to two prescription orders that have been filled and for which the pill containers are currently waiting in respective dispensing shelves 69. For these two prescription orders, an operator touches the Ready Queue GUI tab 120*a* and the prescription orders that are ready to be picked up are displayed within the Ready Queue GUI 120 of FIG. 5. The Ready Queue GUI 120 in FIG. 5 lists all prescription orders that have been successfully processed and are ready to be picked up from the dispensing shelves 69. The dispensing shelf locations appear in the last column entitled "Location."

To complete a prescription order, an operator locates the prescription dispensing shelf 69 containing a prescription, removes the pill container from the dispensing shelf 69 and scans the bar code on the pill container label via bar code scanner 72. Instead of scanning out the pill container, the operator could alternatively pick up the pill container from the prescription dispensing shelf 69, select the prescription order from the Ready queue GUI 120 (FIG. 5), and touch the Complete GUI control 190*g* in the taskbar 190. A confirmation window may also be displayed in response to touching the Complete GUI control 190*g* for the purpose of requiring the operator to verify that he/she intended for a particular prescription order to be indicated as being complete. Alternatively, an operator can wait until all pending prescription orders have been successfully run and then clear them all at once, or one dispensing shelf 69 at a time, from the Ready Queue GUI 120. This is done by the operator touching the Clear All Shelves GUI control 156 within the Ready Shelf GUI 150.

Replenishing Side

Figure 8:
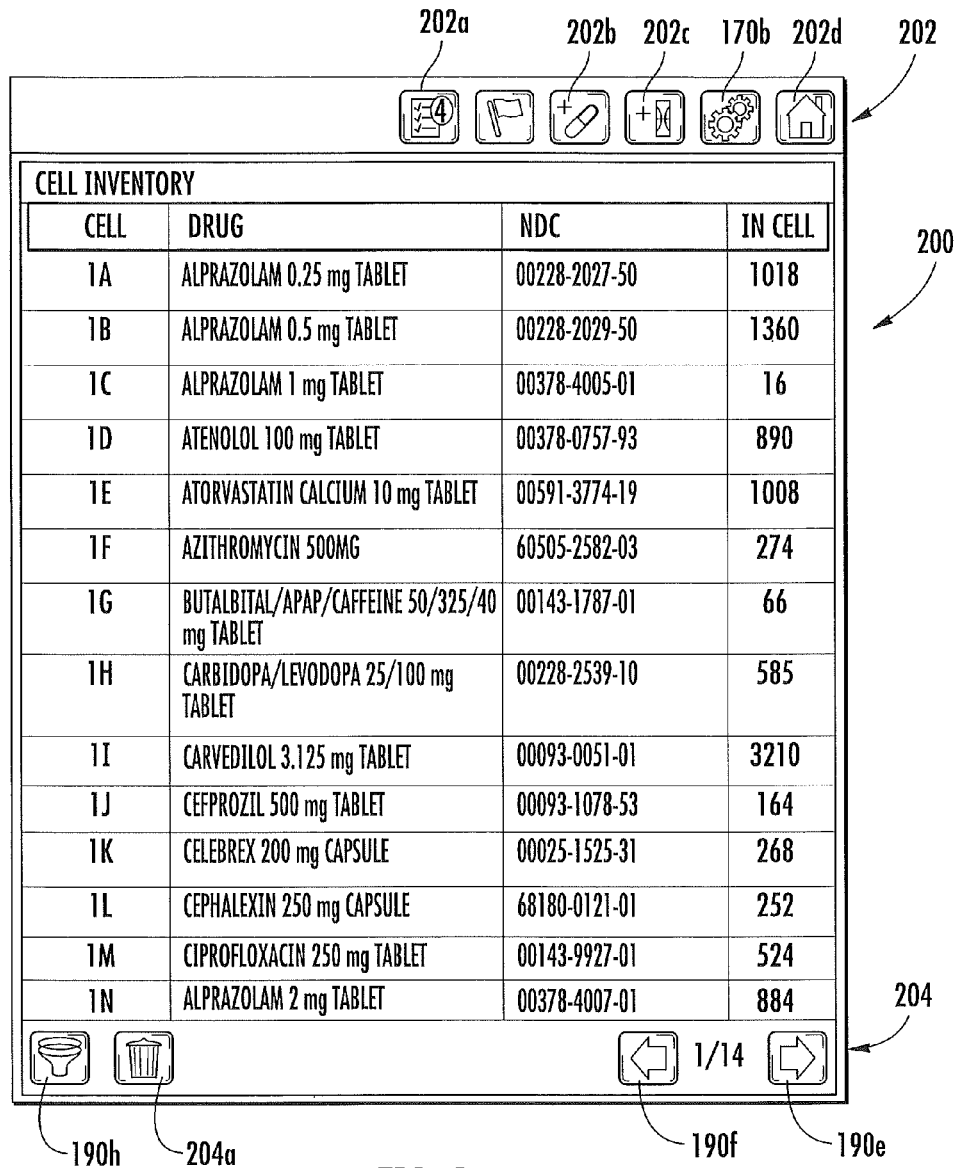
FIGS. 8 and 9 are GUIs that allow an operator of the pharmaceutical dispensing system of FIGS. 2-3 to perform drug replenishing functions, according to some embodiments of the present invention.

Referring now to FIG. 8, an exemplary Cell Inventory GUI 200 is illustrated. The Cell Inventory GUI 200 is considered the "Home GUI" for the replenishing side (FIG. 2) of the illustrated pharmaceutical dispensing system 40. The Cell Inventory GUI 200 displays information about the contents of cells 46 on the replenishing side of the pharmaceutical dispensing system 40 that are currently calibrated to contain a particular drug. For example, the illustrated Cell Inventory GUI 200 displays the following information about each cell 46: cell location, drug contained within cell, NDC (National Drug Code) information, and pill quantity in each cell. As known to those skilled in the art, drug products are identified and reported using a unique, three-segment NDC number, which is a product identifier used in the United States for human drugs. Other countries may utilize similar product identifiers. For example, Canada utilizes a DIN or Drug Identification Number. Embodiments of the present invention may be utilized in any country and various types of drug identification numbers may be utilized, without limitation. Embodiments of the present invention are not limited to the use of NDC information.

The illustrated Cell Inventory GUI 200 has an upper main toolbar 202 and a lower main toolbar 204. GUI controls in the upper main toolbar 202 include Maintenance Tasks GUI control 202a, New Drug GUI control 202b, New Cell GUI control 202c, Systems Functions GUI control 170b, and Home GUI control 202d. Systems Functions GUI control 170b is the same GUI control as described above with respect to the dispensing side Home GUI 100 of FIG. 4.

The Cell Inventory GUI 200 may also serve as the launching point for various wizards, including a Replenish wizard, an RTS wizard, a New Cell wizard, and a New Drug wizard, etc., as described, for example, in co-pending and co-owned U.S. Patent Application Publication No. 2009-0287350, which is incorporated herein by reference in its entirety. For example, the New Drug GUI control 202b launches a New Drug wizard that is used by an operator when adding a new drug to the inventory of the pharmaceutical dispensing system 40, and the New Cell GUI control 202c launches a New Cell wizard that is used by an operator when setting up a new cell 46. The Home GUI control 202d displays the Cell Inventory GUI 200.

GUI controls in the lower main toolbar 204 include the Filter GUI control 190h, Next/Last GUI controls 190e, 190f, and Delete Cell GUI control 204a. The Delete Cell GUI control 204a allows an operator to delete a cell 46 from a database of the pharmaceutical dispensing system 40. As described above, Filter GUI control 190h allows an operator to filter displayed information via, for example, a filter keyboard. Next/Last GUI controls 190e, 190f allow an operator to move forward and backward, respectively, through multiple pages of displayed information.

Figure 9:
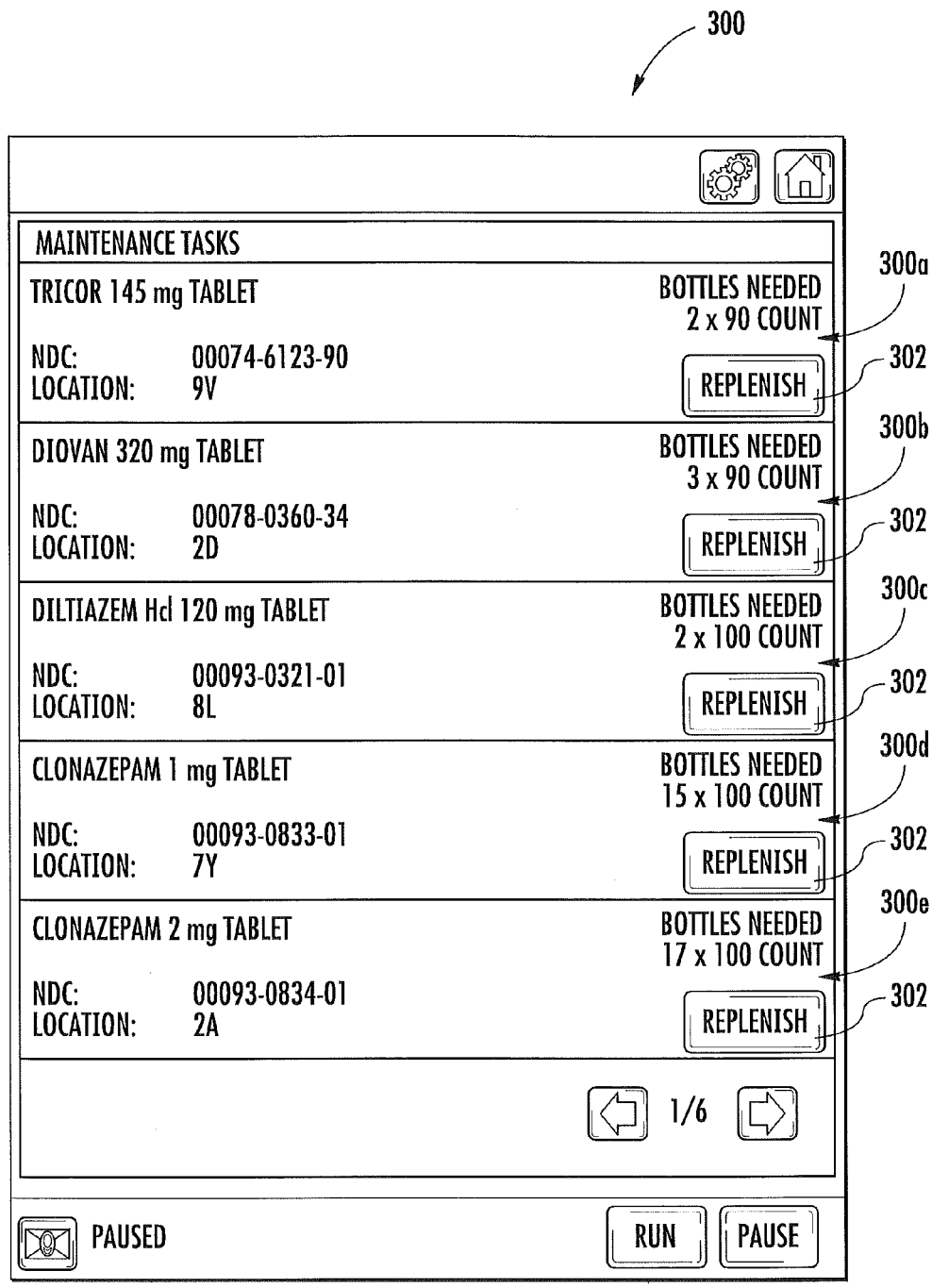

In response to user activation of the Maintenance Tasks GUI control 202a, a Maintenance Tasks GUI 300 is displayed, as illustrated in FIG. 9. The Maintenance Tasks GUI 300 identifies which cells 46 (FIG. 2) of the pharmaceutical dispensing system 40 require replenishing and provides information about each respective cell 46 that requires replenishing before the next day's operation. For example, the illustrated Maintenance Tasks GUI 300 displays information about five respective cells requiring replenishing in five respective sections 300a-300e of the GUI 300. Referring, for example, to section 300a, the cell at location 9V (e.g., the location of the cell in the array of cells 46 in FIG. 2) is identified as containing the drug Tricor in 145 mg tablets with an NDC number of 00074-6123-90. Section 300a also indicates that two stock bottles containing 90 tablets each are required to replenish cell 9V before the next day's operation. The Maintenance Tasks GUI 300 may also be utilized for initiating and/or providing information about various other tasks, such as routine cell cleaning, for example.

Figure 10:
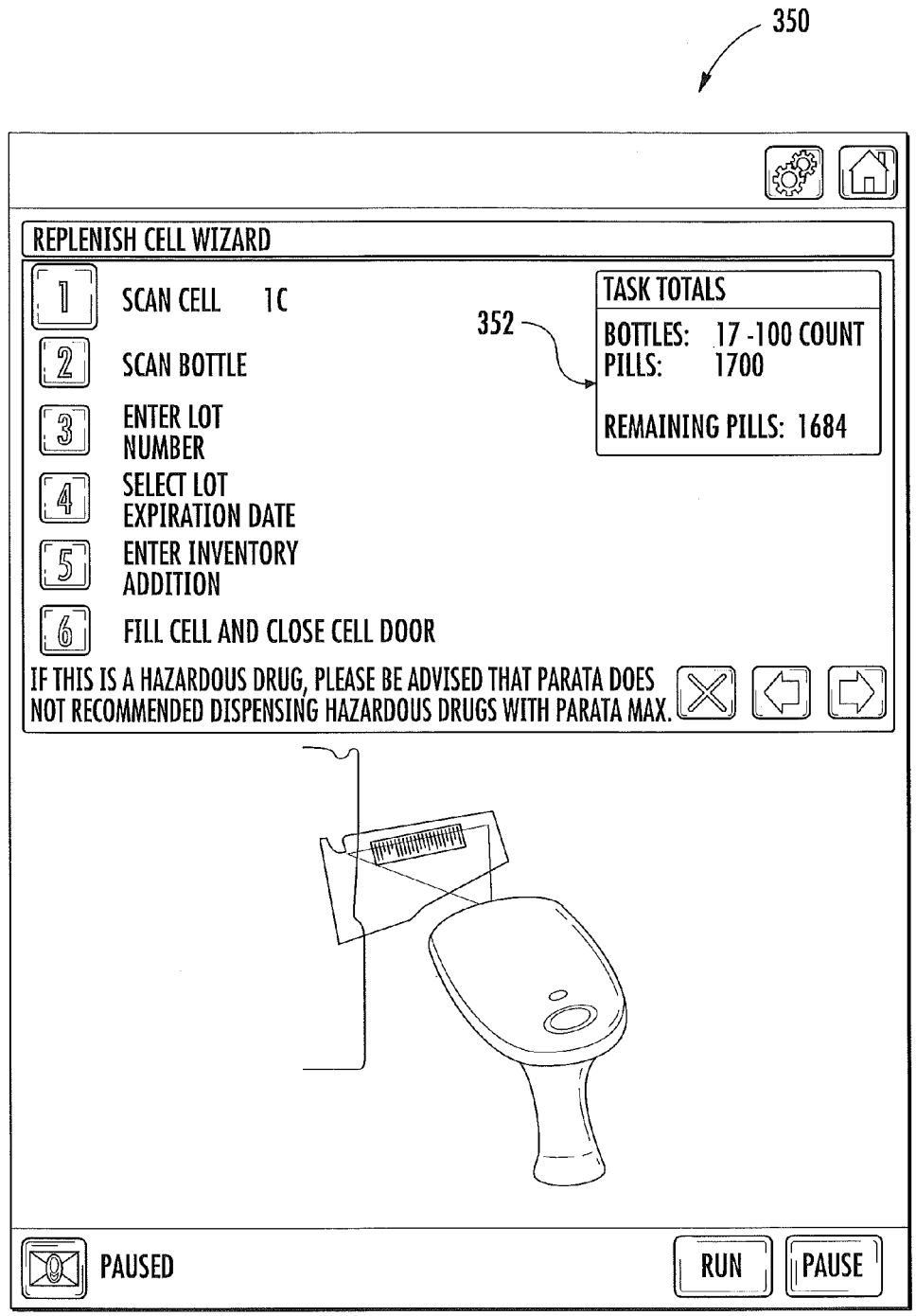
FIG. 10 is an exemplary cell Replenishment Wizard GUI, according to some embodiments of the present invention.

Each section in the Maintenance Tasks GUI 300 (FIG. 9) also includes a Replenish GUI control 302. User activation of a Replenish GUI control 302 launches the Replenishment Wizard. As described in co-pending and co-owned U.S. Patent Application Publication No. 2009-0287350, the Replenishment Wizard guides a user how to replenish a cell 46 with pills and includes information about how many stock bottles of pills are required. For example, FIG. 10 illustrates an exemplary Replenishment Wizard GUI 350. In the upper right-hand corner of the illustrated Replenishment Wizard GUI 350 is task information box 352 that provides replenishment information about a particular cell 46. In the illustrated embodiment, the task information box 352 informs a user that cell 1C needs to be replenished with 1700 pills, which should come from 17 stock bottles of 100 pills each. The illustrated task information box 352 also provides the total number of pills currently in cell 1C.

Referring back to the Cell Inventory GUI 200 of FIG. 8, the illustrated Maintenance Tasks GUI control 202a in FIG. 8 includes a bubble with the number four (4). This bubble is used to indicate to an operator the number of cells 46 that require replenishment before the next day's operation.

Generation of the Maintenance Tasks GUI

Each day (e.g., at 4:00 am, etc.), before a pharmaceutical dispensing system 40 is operated to fill prescriptions, a cell replenishment program is executed by one or more processors associated with the pharmaceutical dispensing system 40. It is understood that the cell replenishment program may be executed by one or more processors associated with various types of automated and semi-automated pharmaceutical dispensing systems. Embodiments of the present invention are not limited to any particular type of processor or configuration of processor(s).

According to some embodiments of the present invention, the cell replenishment program looks at the dispense history for all of the cells 46 of the pharmaceutical dispensing system 40 and makes a determination if there are enough pills in the respective cells 46 for the next day of operations based on historical information regarding the rate of dispensing of the drugs within the cells 46. In other words, the cell replenishment program checks to see if the quantity currently in a cell is below the Replenish Point for that cell. As described further below, the replenish point is calculated based on historic information (daily average+(standard deviation×stock-out risk)). If a cell 46 does not contain enough pills for the next day, a maintenance task is created that instructs an operator to fill the cell 46. In addition, the cell replenishment program is configured to calculate an optimal amount of pills (referred to as the "replenish quantity") for each cell 46 based on demand, inventory costs, and other statistical analyses.

In addition, according to some embodiments of the present invention, the cell replenishment program can predict when pills will be needed in the future for one or more cells 46 and automatically place an order from a drug manufacturer or other source, for example, via a communications network (e.g., the Internet, a wireless network, etc.), such that sufficient inventory is on hand prior to a future date.

Figure 11:
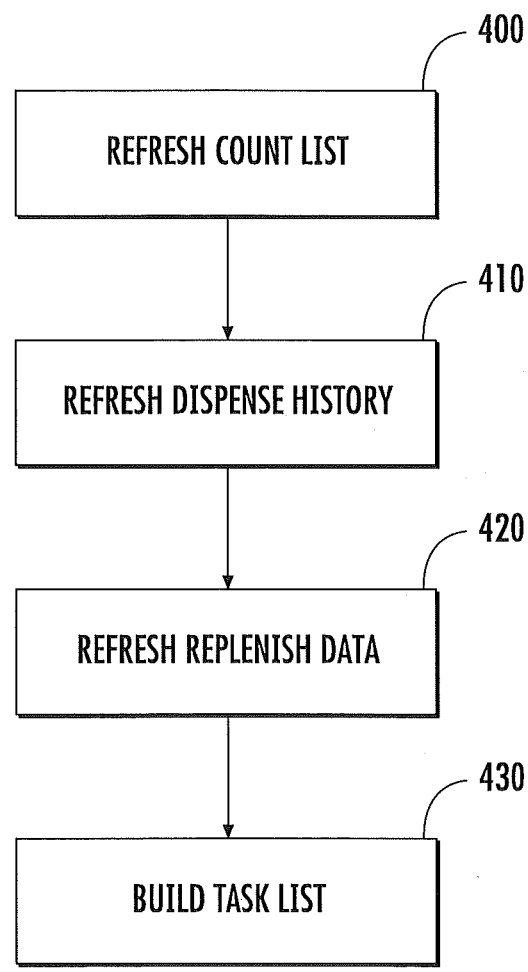
FIGS. 11-14 are flow charts illustrating operations for optimizing the replenishment of pills within cells of a pharmaceutical dispensing system, such as the pharmaceutical dispensing system of FIGS. 2-3, according to some embodiments of the present invention.
Figure 13:
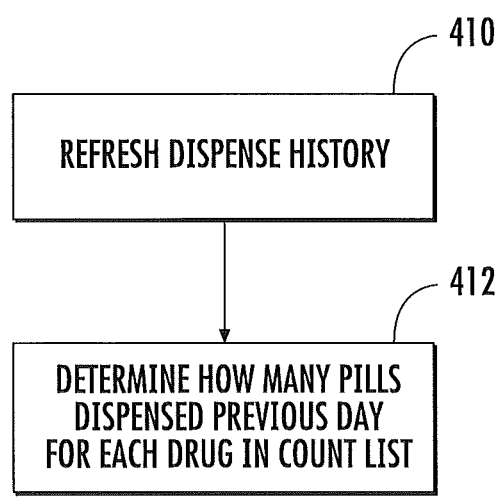

According to some embodiments of the present invention, the cell replenishment program can predict/suggest the optimal stock bottle size for a particular cell 46. Typically, the cell replenishment program will instruct the user as to the total number of stock bottles needed based on the last stock bottle used to replenish a particular cell 46. However, if there is a more optimal way to replenish the cell 46 using a larger stock bottle (i.e., a stock bottle containing more pills), the cell replenishment program will suggest this on the drug order. This may be more optimal, for example, because the cost of a larger stock bottle may be less than the cost of multiple smaller bottles. If the suggested new stock bottle size is ordered and used to replenish, the next task will use the new bottle size. For example, if the user is using 100 pill stock bottles and the replenish quantity is 2300, the cell replenishment program will make a task of twenty-three 100 pill bottles. But in the drug order, the cell replenishment program will suggest ordering two 1,000 pill bottles. Stock bottle suggestions are based on the Food and Drug Administration (FDA) package codes database that is released each week and which can be found at www.FDA.gov. Embodiments of the present invention, however, are not limited to only suggesting larger size optimal stock bottles. Stock bottles that have smaller pill quantities may also be determined by the cell replenishment program to be optimal and, thereby, suggested. In this case, a smaller bottle may be optimal because of the cost of maintaining inventory, particularly for pills that are not dispensed very often, etc.

ing system 40 (Block 410, FIG. 11). This includes determining how many pills were dispensed for each drug in the count list (i.e., how many pills were dispensed from each cell 46) during the previous day (Block 412, FIG. 13). For example, the total number of pills dispensed for each drug in filling prescriptions during the previous day is calculated.

Next, the cell replenishment program refreshes the replenish data (Block 420, FIG. 11). Data associated with replenishing cells 46 in the pharmaceutical dispensing system 40 is collected and processed each day throughout the operating life of the pharmaceutical dispensing system 40. As such, there is a lot of historical data for each drug dispensed by the pharmaceutical dispensing system 40 and for each cell 46 of the pharmaceutical dispensing system 40. Exemplary replenish data that is monitored includes, but is not limited to, total prescriptions filled from each cell 46, total pill quantity dispensed for each cell 46, the average dispense amount for each cell 46 per day, the maximum dispense amount per cell 46, total days a particular drug was dispensed, etc. Table 1 below illustrates various types of historical data that can be maintained and updated daily for each cell 46, according to some embodiments of the present invention.

TABLE 1

| Drug | Replenish Point | Actual Qty | Daily Avg Non Zero | Daily Max | Avail Cap | Pkg Qty | | | Bottles | Total | Days Supply |
| --- | --- | --- | --- | --- | --- | --- | --- | --- | --- | --- | --- |
| 003784005 | 637 | 16 | 188 | 1020 | 2212 | 100 | 16 | Pills | 22 | 2216 | 14.4 |
| 005913776 | 152 | 129 | 57 | 135 | 276 | 90 | 129 | Pills | 3 | 399 | 8.5 |
| 633040692 | 184 | 160 | 76 | 260 | 160 | 100 | 160 | Pills | 1 | 260 | 6.8 |
| 683820139 | 276 | 210 | 119 | 330 | 1401 | 60 | 210 | Pills | 23 | 1590 | 27.9 |

Figure 12:
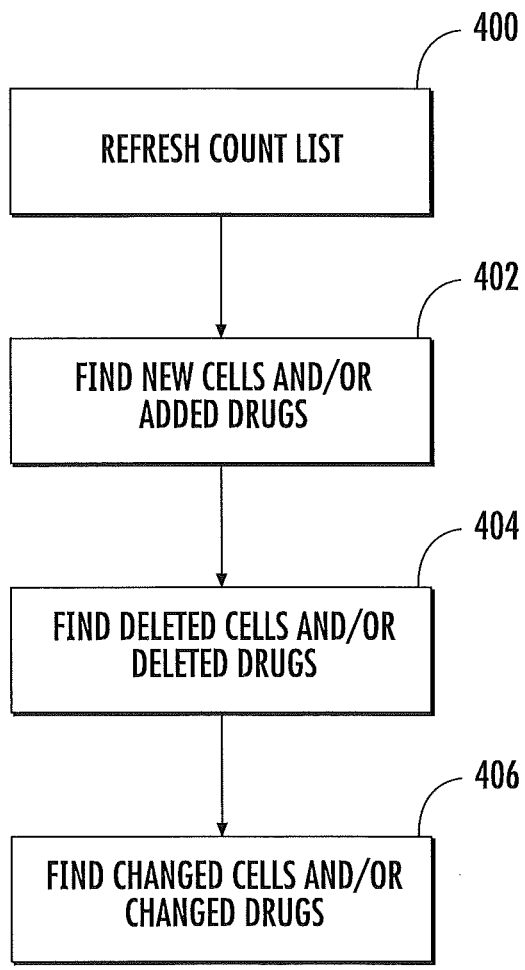

Referring now to FIG. 11, operations of a cell replenishment program, according to some embodiments of the present invention, will be described. Initially, the cell replenishment program refreshes the count list (Block 400). The term "count list" refers to the number of cells 46 in operation in a dispensing system and the drug and quantity thereof contained within each cell 46. Thus, the cell replenishment program checks a pharmaceutical dispensing system, such as pharmaceutical dispensing system 40, to see if any changes to the cells 46 or to the contents of the cells 46 have occurred since the program was last run. For example, the cell replenishment program determines if any new cells 46 have been placed in operation in the pharmaceutical dispensing system 40 since the previous day and/or if any new drugs have been added to existing cells 46 by an operator (Block 402, FIG. 12). Next, the cell replenishment program determines if any cells 46 have been taken out of operation in the pharmaceutical dispensing system 40 since the previous day and/or if any drugs have been deleted from existing cells 46 (Block 404, FIG. 12). For example, one or more cells 46 may have been taken out of service due to maintenance issues, inventory issues, or for some other reason. In addition, new cells 46 may have been placed into operation. Next, the cell replenishment program determines if the contents of any Of the cells 46 have changed (i.e., whether the drug contained within a cell has changed) since the previous day (Block 406, FIG. 12). For example, during flu season, additional cells 46 may be required to carry the inventory necessary for filling the increased number of prescriptions required to meet the demand caused by the flu. As such, a drug previously occupying a cell 46 may be removed and replaced with a particular flu drug, etc.

Next, the cell replenishment program refreshes the dispense history for each cell 46 of the pharmaceutical dispens- This information may be displayed to a user via the cell inventory GUI 200 or via another GUI, according to some embodiments of the present invention.

Figure 14:
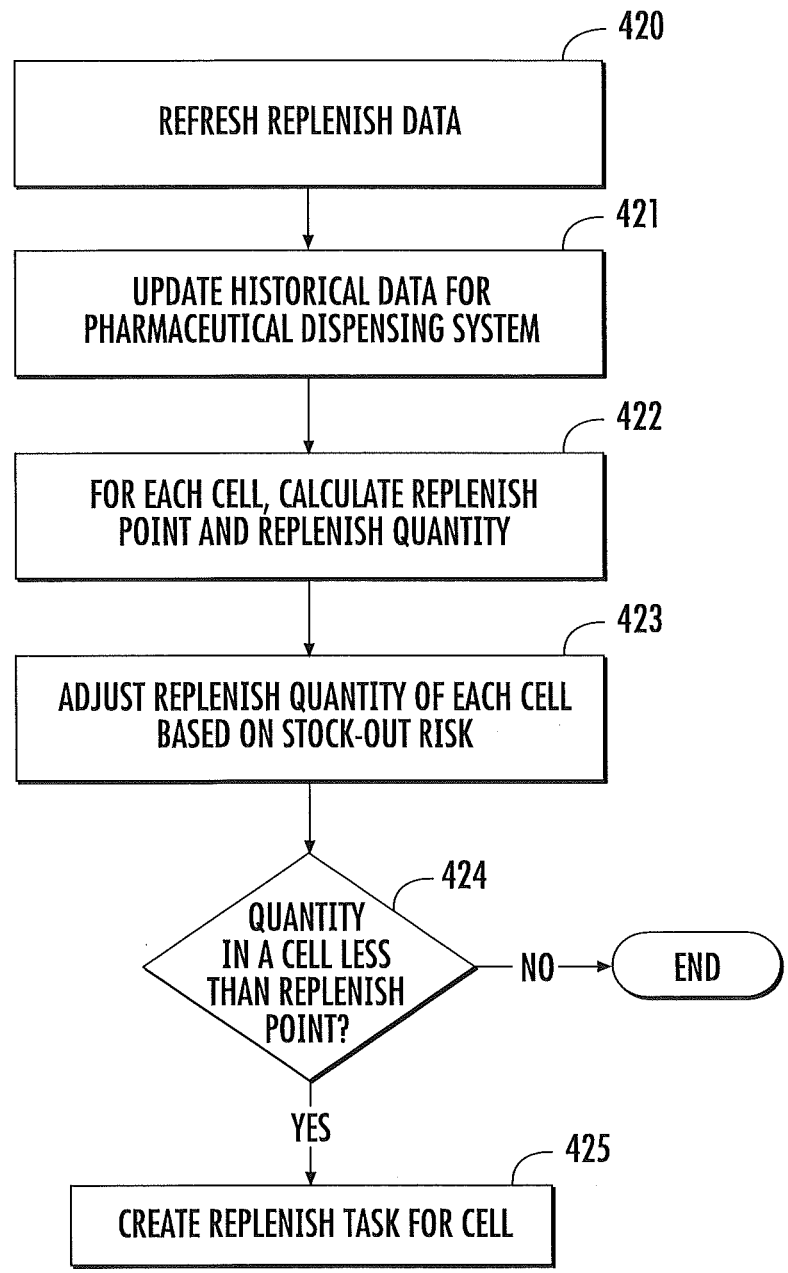

Thus, each day, the previous day's information is added to the historical dispense data (Block 421, FIG. 14). Various statistical calculations are performed using the updated replenish data to arrive at a replenish point and a replenish quantity for each cell 46 (Block 422, FIG. 14). The replenish point is the quantity of pills within a cell 46 below which requires the cell 46 to be replenished. The replenish quantity is the amount of pills to be added to a particular cell.

The replenish quantity for each cell may then be adjusted depending on the "stock-out" risk of each cell 46 (Block 423, FIG. 14). Stock-out risk refers to the risk of running out of pills in a particular cell 46 for any given day. There is an inventory cost associated with keeping too many pills in a particular cell. The goal is to maintain sufficient pill quantity within a cell without adding too much to the cost of carrying the inventory. For certain drugs, it is worth adding more pills to a cell than may be necessary, because it is important that the cell not run out of pills. Cells containing these drugs are referred to as "high runners" and the replenishment quantity is calculated as $2.50\sigma$, where sigma represents the standard deviation of daily dispense quantity. However, other values greater than or less than $2.5\sigma$ may be utilized.

Other cells containing drugs that are of lesser criticality may be referred to as "medium runners" and the replenishment quantity is calculated as $2.0\sigma$, while other cells containing drugs of low criticality may be referred to as "low runners" and the replenishment quantity is calculated as $1.5\sigma$, for example. However, other values greater than or less than $2.0\sigma$ may be utilized for medium runners and other values greater than or less than $1.5\sigma$ may be utilized for low runners.

Also, stock-out risk may be calculated based on the number of days a particular drug is dispensed. For example, a high runner may be a cell 46 where the daily dispense quantity for the cell was greater than the average daily dispense quantity 75% of the days (i.e., at least 68 days over a 90 day period). For example, a medium runner may be a cell 46 where the daily dispense quantity for the cell was greater than the average daily dispense quantity 25% of the days. For example, a low runner may be a cell 46 where the daily dispense quantity for the cell was less than the average daily dispense quantity 25% of the days. However, the cell replenishment program can modify and/or override these values for any drug. Thus, after calculating the replenish point and replenish quantity for each cell in the pharmaceutical dispensing system 40, the replenish quantity for each cell is adjusted based upon stock-out risk (Block 423, FIG. 14).

A determination is then made if a drug within a cell 46 is at or below the replenish point (i.e., does the cell have enough pills to get through the next day without running out, based on historical dispense information) (Block 424, FIG. 14). In some embodiments of the present invention, a drug may be spread out across multiple cells 46. One cell 46 may be out of the drug, while another cell has sufficient quantity. The cell replenishment program may be configured to only initiate a replenishment task if the total amount of the drug in both cells is below the replenish point.

If the answer at Block 424 is yes, then a replenish task is created that instructs an operator of the pharmaceutical dispensing system 40 to replenish the particular cell (Block 425, FIG. 14). The replenish task tells the operator how many pills to add to the cell, including how many stock bottles of pills to utilize in the replenishment. For example, if a cell requires 1,000 pills, the operator may be instructed via the replenish task to use 4 stock bottles, each containing 250 pills.

The replenish point for each cell 46 is typically a dynamic number, based on the information collected and evaluated. For example, the replenish point for allergy medication might be different in the winter than it is in the spring. One week, for example, very little of an allergy medication may be dispensed; however, the next week, a lot of the allergy medication may be dispensed.

After operations of Block 422-425 have been run for each cell of the pharmaceutical dispensing system 40, a Maintenance Task GUI 300 (FIG. 9) is built and displayed to an operator of the pharmaceutical dispensing system (Block 430, FIG. 11). The Maintenance Task GUI 300 includes a list of the replenish tasks for the cells of the pharmaceutical dispensing system 40 that require replenishing before the next day's operation.

Figure 15:
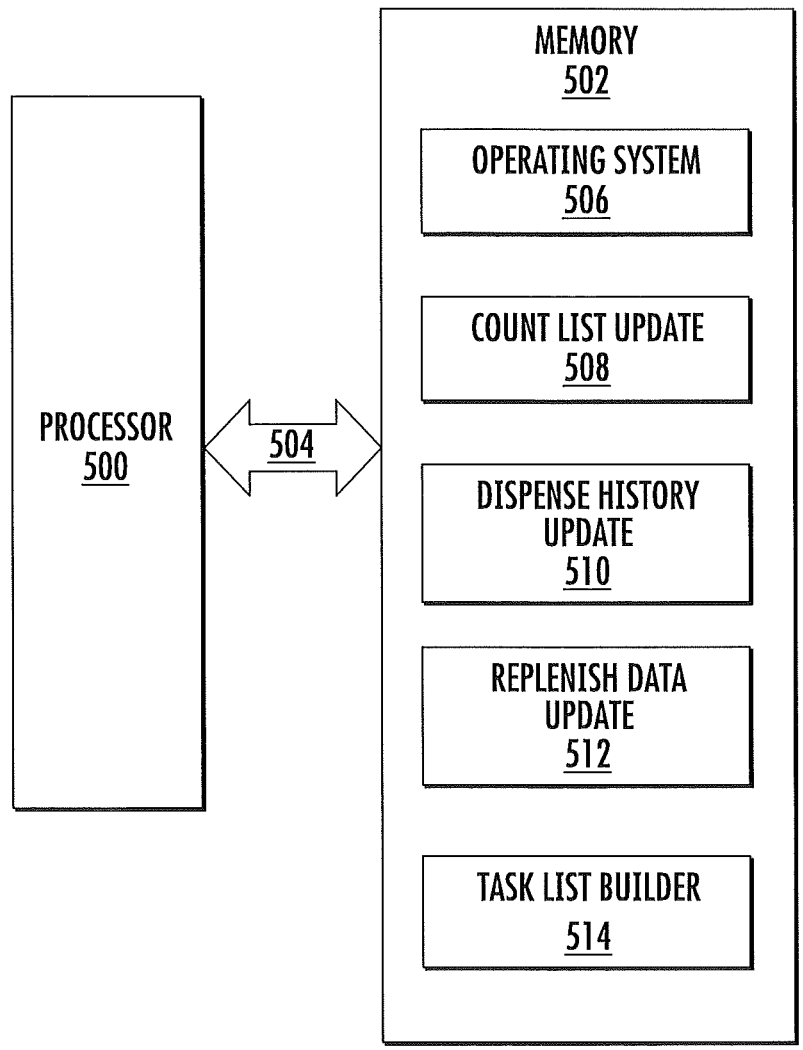
FIG. 15 is a block diagram that illustrates a software architecture for implementing drug replenishment of a pharmaceutical dispensing system, such as the pharmaceutical dispensing system of FIGS. 2-3, in accordance with some embodiments of the present invention.

FIG. 15 illustrates a processor 500 and a memory 502 that may be used to implement the various replenishing operations of a pharmaceutical dispensing system 40, according to some embodiments of the present invention. For example, in some embodiments of the present invention, the processor 500 and memory 502 may be used to embody the processors and the memories used in updating drug dispensing data and calculating drug replenishment data for the various cells 46 of a pharmaceutical dispensing system 40. Processor 500 and memory 502 may also be used to implement other operations of a pharmaceutical dispensing system 40, such as automatically filling prescription orders, replenishing pills within cells 46, modifying parameters of cells 46, adding new drugs to inventory, creating reports, etc.

The processor 500 communicates with the memory 502 via an address/data bus 504. The processor 500 may be, for example, a commercially available or custom microprocessor. The memory 502 is representative of the overall hierarchy of memory devices containing the software and data used to replenish pills within cells 46, in accordance with some embodiments of the present invention. The memory 502 may include, but is not limited to, the following types of devices: cache, ROM, PROM, EPROM, EEPROM, flash, SRAM, and DRAM.

As shown in FIG. 15, the memory 402 may hold five or more major categories of software and data: an operating system 506, a count list update module 508, a dispense history update module 510, a replenish data update module 512, and a task list builder module 514. The operating system 506 controls operations of the count list update module 508, dispense history update module 510, replenish data update module 512, and task list builder module 514.

The count list update module 508 comprises logic for identifying changes to cells 46 in a pharmaceutical dispensing system 40 and drugs within cells 46, as described above with respect to FIG. 12. The dispense history update module 510 comprises logic for determining how many pills were dispensed from each cell 46 of a pharmaceutical dispensing system 40 the previous day, as described above with respect to FIG. 13. The replenish data update module 512 comprises logic for updating historical replenishing data for each cell of a pharmaceutical dispensing system 40 and for calculating a replenish point and replenish quantity for cells 46 of a pharmaceutical dispensing system 40, as described above with respect to FIG. 14. The task list builder module 514 comprises logic for building replenish tasks and displaying them via Maintenance Task GUI 300, illustrated in FIG. 9.

Although FIG. 15 illustrates an exemplary software architecture that may facilitate automatically replenishing pills within cells 46, it will be understood that the present invention is not limited to such a configuration, but is intended to encompass any configuration capable of carrying out the operations described herein.

Computer program code for carrying out operations of the count list update module 508, dispense history update module 510, replenish data update module 512, and task list builder module 514 may be written in a high-level programming language, such as Python, Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A pharmaceutical dispensing system, comprising:
a frame having first and second opposed sides;
a plurality of cells configured to house pharmaceutical pills, each of the cells being accessible from the first side of the frame for replenishment of pharmaceutical pills therein;
a display on the frame first side;
a processor;
memory coupled to the processor; and
a computer program residing in the memory that is executable by the processor for displaying a cell inventory graphical user interface (GUI) within the display, wherein the cell inventory GUI displays cell inventory information, and wherein the cell inventory GUI comprises a GUI control that is responsive to user activation for displaying replenishment information about one or more of the cells, wherein the replenishment information for each cell comprises an identification of a drug to be replenished within the cell, a total number of pills needed to replenish the cell, and a size and total number of stock bottles needed to replenish the cell.

2. The system of claim 1, wherein the GUI control displays a number of cells requiring replenishment.

3. The system of claim 1, wherein the computer program is executable by the processor for determining a replenish point and replenish quantity for each cell.

4. The system of claim 3, wherein the computer program is executable by the processor for adjusting the replenish quantity for each cell according to stock-out risk for each cell.

5. The system of claim 4, wherein the replenish quantity for each cell is calculated as at least 1.5σ, wherein σ represents a standard deviation of daily pill dispense quantity for a respective cell.

6. The system of claim 4, wherein the replenish quantity for each cell is calculated as between about 1.5σ and about 2.5σ, wherein σ represents a standard deviation of daily pill dispense quantity for a respective cell.

7. The system of claim 1, wherein the cell inventory GUI information comprises the following information about each cell: cell location, drug contained within cell, NDC (National Drug Code) information, and pill quantity in each cell.

8. The system of claim 1, wherein the computer program is executable by the processor for identifying any cells that are currently in operation that were not in operation during the previous day and for identifying any cells that were in operation during the previous day that are not currently in operation.

9. The system of claim 1, wherein the computer program is executable by the processor for identifying any cells that are currently in operation that contain a different drug from the previous day.

10. The system of claim 1, wherein the computer program is executable by the processor for predicting when pills will be needed in the future for one or more cells and automatically placing an order from a drug source such that sufficient pill inventory is on hand prior to a future date.

11. A method of determining replenishment quantities for pills dispensed by a pharmaceutical dispensing system, wherein the pharmaceutical dispensing system includes a plurality of cells configured to house pharmaceutical pills for dispensing, a display, and at least one processor, the method comprising:
statistically analyzing, via the at least one processor, historical dispensing data to determine a replenish point and a replenish quantity for each cell, wherein the replenish point is a threshold amount below which requires the cell to be replenished with pills, and wherein the replenish quantity is an amount of pills to be added to the cell when a quantity of pills in the cell is below the replenish point; and
displaying a cell inventory graphical user interface (GUI) within the display, wherein the cell inventory GUI displays cell inventory information, and wherein the cell inventory GUI comprises a GUI control that is responsive to user activation for displaying replenishment information about one or more of the cells, and wherein the replenishment information for each cell comprises an identification of a drug to be replenished within the cell, a total number of pills needed to replenish the cell, and a size and total number of stock bottles needed to replenish the cell.

12. The method of claim 11, further comprising adjusting the replenish quantity based upon stock-out risk for any given day.

13. The method of claim 12, wherein adjusting the replenish quantity based upon stock-out risk for any given day comprises selecting a multiple value and calculating the replenish quantity by multiplying a standard deviation of a daily dispense quantity by the multiple value.

14. The method of claim 11, wherein the replenish quantity for each cell is calculated as least 1.5σ, wherein σ represents a standard deviation of daily pill dispense quantity for a respective cell.

15. The method of claim 11, wherein the replenish quantity for each cell is calculated as between about 1.5σ and about 2.5σ, wherein σ represents a standard deviation of daily pill dispense quantity for a respective cell.

16. The method of claim 13, wherein the daily dispense quantity is a daily dispense quantity for a particular cell or for a particular pharmaceutical pill.

17. The method of claim 11, wherein the GUI control displays a number of cells requiring replenishment.

18. A computer program product, comprising a non-transitory computer readable storage medium having encoded thereon instructions that, when executed on a processor, causes the processor to perform operations comprising:
statistically analyzing historical dispensing data to determine a replenish point and a replenish quantity for each cell, wherein the replenish point is a threshold amount below which requires the cell to be replenished with pills, and wherein the replenish quantity is an amount of pills to be added to the cell when a quantity of pills in the cell is below the replenish point; and
displaying a cell inventory graphical user interface (GUI) within a display, wherein the cell inventory GUI displays cell inventory information, wherein the cell inventory GUI comprises a GUI control that is responsive to user activation for displaying replenishment information about one or more of the cells, wherein the GUI control displays a number of cells requiring replenishment, and wherein the replenishment information for each cell comprises an identification of a drug to be replenished within the cell, a total number of pills needed to replenish the cell, and a size and total number of stock bottles needed to replenish the cell.

* * * * *